United States Patent
Byers et al.

(10) Patent No.: US 9,609,569 B2
(45) Date of Patent: Mar. 28, 2017

(54) HIGH-SPEED MOBILE BROADBAND ACCESS BY SLEWING BETWEEN VEHICULAR NARROWBEAM TRANSCEIVER AND FIXED TRANSCEIVERS ALONG PRESCRIBED PATH

(71) Applicant: Cisco Technology, Inc., San Jose, CA (US)

(72) Inventors: Charles Calvin Byers, Wheaton, IL (US); Douglas Chan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 86 days.

(21) Appl. No.: 14/031,853

(22) Filed: Sep. 19, 2013

(65) Prior Publication Data

US 2015/0078333 A1    Mar. 19, 2015

(51) Int. Cl.
*H04W 36/32* (2009.01)
*H04W 16/28* (2009.01)

(52) U.S. Cl.
CPC .......... *H04W 36/32* (2013.01); *H04W 16/28* (2013.01)

(58) Field of Classification Search
None
See application file for complete search history.

(56) References Cited

U.S. PATENT DOCUMENTS

| 4,945,367 | A | 7/1990 | Blackshear |
| 5,512,912 | A | 4/1996 | Ross et al. |
| 6,003,818 | A * | 12/1999 | Shah et al. ............ 244/165 |
| 6,650,451 | B1 | 11/2003 | Byers et al. |
| 6,687,503 | B1 * | 2/2004 | Porter et al. ............ 455/452.1 |
| 7,203,425 | B1 * | 4/2007 | Keller et al. ............ 398/123 |
| 8,315,636 | B2 | 11/2012 | Moon et al. |
| 2001/0027103 | A1 | 10/2001 | Willingham et al. |
| 2005/0076054 | A1 | 4/2005 | Moon et al. |
| 2005/0259619 | A1 * | 11/2005 | Boettle et al. ............ 370/331 |
| 2006/0067296 | A1 * | 3/2006 | Bershad et al. ............ 370/351 |

(Continued)

OTHER PUBLICATIONS

Cambridge Technology, "Optical Scanning Components", [online], [retrieved on Aug. 16, 2013]. Retrieved from the Internet: URL: <http://www.camtech.com/index.php?option=com_docman&task=doc_download&gid=363&Itemid=123> 6 pages.

(Continued)

*Primary Examiner* — Noel Beharry
*Assistant Examiner* — Wilfred Thomas
(74) *Attorney, Agent, or Firm* — Leon R. Turkevich

(57) ABSTRACT

In one embodiment, a method comprises: establishing a first broadband data link between a first mobile narrowbeam transceiver positioned on a vehicle and a first fixed narrowbeam transceiver mounted along a prescribed path of the vehicle; and switching from the first broadband data link, by the first mobile narrowbeam transceiver, to a second broadband data link with a second fixed narrowbeam transceiver mounted along the prescribed path after the first fixed narrowbeam transceiver, enabling the vehicle to maintain continuous broadband access to a wide area network via a prescribed sequence of the fixed narrowbeam transceivers along the prescribed path.

15 Claims, 6 Drawing Sheets

(56) References Cited

U.S. PATENT DOCUMENTS

| | | | | |
|---|---|---|---|---|
| 2009/0186611 | A1* | 7/2009 | Stiles | H04B 7/18506 455/431 |
| 2011/0255452 | A1* | 10/2011 | Brooks | 370/297 |
| 2011/0267969 | A1 | 11/2011 | Ceccherini et al. | |

OTHER PUBLICATIONS

Cambridge Technology. "Mounted XY Galvo Sets", [online] 2011, [retrieved on Aug. 16, 2013]. Retrieved from the Internet: URL: <http://www.camtech.com/index.php?view=article&catid=53%3Aoptical-scanner-sets&id=96%3Amounted-xy-galvo-sets&tmpl=component&print=1&layout=default&page=&option=com_content&Itemid=85>, pp. 1-2.

Canon, "Free Space Optics", [online] 2013, [retrieved on Aug. 13, 2013]. Retrieved from the Internet: URL: <http://www.usa.canon.com/cusa/professional/products/free_space_optics>, 1 page.

Yuksel et al., "Free-Space Optical Mobile Ad Hoc Networks: Auto-Configurable Building Blocks", [online], 2009, [retrieved on Aug. 13, 2013]. Retrieved from the Internet: URL: http://citeseerx.ist.psu.edu/viewdoc/download?doi=10.1.1.183.8168&rep=rep1&type=pdf>, pp. 1-25.

"Hyperloop Alpha", [online], [retrieved on Sep. 16, 2013]. Retrieved from the Internet: URL: <http://www.teslamotors.com/sites/default/files/blog_images/hyperloop-alpha.pdf>, pp. 1-58.

Akella et al., "Building Blocks for Mobile Free-Space-Optical Networks", IEEE, [online], [retrieved on Aug. 13, 2013]. Retrieved from the Internet: URL: <http://ieeexplore.ieee.org/xpls/abs_all.jsp?arnumber=1436011&tag=1>, pp. 1-5.

Minch et al., "Adaptive Transceivers for Mobile Free-Space Optical Communications", [online], [retrieved on Aug. 13, 2013]. Retrieved from the Internet: URL: <http://www.mitre.org/work/tech_papers/tech_papers_06106_0822/06_0822.pdf>, pp. 1-5.

Wikipedia, "Row 44", [online], Dec. 6, 2012, [retrieved on Aug. 23, 2013]. Retrieved from the Internet: URL: <http://en.wikipedia.org/w/index.php?title=Row_44&printable=yes>, pp. 1-5.

Krivak et al., "Long Range Free Space Optical Link", [online], IEEE Radioelektronika, 2007. 17th International Conference, Apr. 24-25, 2007 [retrieved on Aug. 26, 2013]. Retrieved from the Internet: URL: <http://ieeexplore.ieee.org/stamp/stamp.jsp?arnumber=04234277>, pp. 1-5.

Wi-Fi-Rail, [online], 2012, [retrieved on Aug. 13, 2013]. Retrieved from the Internet: URL: <http://www.wifirail.net/>, pp. 1-3.

Abe et al., "A study on antennas for railway millimeter-wave radio communication system", Personal Wireless Communications, 1997, IEEE International Conference Mumbai, India, XP010268061,Dec. 17-19, 1997, pp. 201-205.

Haruyama et al., "New Ground-to-Train High-Speed Free-Space Optical Communication System with Fast Handover Mechanism", Optical Fiber Communication Conference, OFC 2011; Los Angeles, CA; United States; Mar. 6-10, 2011, Optical Society of America, 3 pages.

Demers et al., "Survey or Free Space Optical (FSO) Communications Opportunities in Next Generation Cellular Networks", [online] May 4, 2011, [retrieved on Aug. 13, 2013]. Retrieved from the Internet: URL: <http://www.google.com/url?sa=t&rct=j&q=mobile%20free%20space%20optical%20links&source=web&cd=11&cad=rja&ved=0CEoQFjAAOAo&url=http%3A%2F%2Fwww.sce.carleton.ca%2Ffaculty%2Fyanikomeroglu%2FPub%2Fcnsr2011-fdhymsh-presentation.ppt&ei=mwc6UaacJIe70QGT14HYDg&usg=AFQjCNEVf37KAIAeVUvcjkW99KoD4h-C2Q&bvm=bv.43287494,d.dmQ>, 27 slides.

Wang et al., "Mobile Free Space Optical Communication System", [online], [retrieved on Aug. 13, 2013]. Retrieved from the Internet: URL: <http://digitalcommons.calpoly.edu/cgi/viewcontent.cgi?article=1100&context=eeng_fac&sei-redir=1&referer=http%3A%2F%2Fwww.google.com%2Furl%3Fsa%3Dt%26rct%3Dj%26q%3Dmobile%2520free%2520space%2520optical%2520links%26source%3Dweb%26cd%3D6%26cad%3Drja%26ved%3D0CGkQFjAF%26url%3Dhttp%253A%252F%252Fdigitalcommons.calpoly.edu%252Fcgi%252Fviewcontent.cgi%253Farticle%253D1100%2526context%253Deeng_fac%26ei%3DtAY6UeiSOsrE0QHpIIDYBQ%26usg%3DAFQjCNFK1wsV_xPZhn_gBFNHxe8zQaSvGQ%26bvm%3Dbv.43287494%2Cd.dmQ#search=%22mobile%20free%20space%20optical%20links%22>, pp. 1-7.

* cited by examiner

70

IDENTIFY PRESCRIBED POSITIONS OF FIXED NARROWBEAM TRANSCEIVERS ALONG PRESCRIBED VEHICLE PATH (E.G., TRAIN TRACK, ROADWAY LANE(S), WATERWAY, AIRWAY) TO GUARANTEE CONTINUOUS BROADBAND ACCESS TO WAN FOR VEHICLE-MOUNTED MOBILE NARROWBEAM TRANSCEIVER:

-1 Gb/s OR HIGHER FOR EACH BROADBAND DATA LINK, COLLIMATED LIGHT OR CENTIMETER (OR SMALLER) WAVE;

-SLEW ANGLES ON HANDOFF ABOUT 10 DEGREES OR LESS (I.E., 10-12 DEGREES OR LESS)

-DURING HANDOFF FIXED/MOBILE NARROWBEAM TRANSCEIVERS SLEW 10 DEGREES WITHIN TENS OF MILLISECONDS (E.G., WITHIN ABOUT 1 MILLISECOND) FOR VEHICLE (E.G., TRAIN) TRAVELING 320km/hr.

-FORWARD-DIRECTION TRANSCEIVERS CONNECTED WHILE REVERSED-DIRECTION TRANSCEIVERS HANDOFF, REVERSED-DIRECTION TRANSCEIVERS CONNECTED WHILE FORWARD-DIRECTION TRANSCEIVERS HANDOFF

72

DEPLOY PRESCRIBED SEQUENCE OF FIXED NARROWBEAM TRANSCEIVERS ALONG PRESCRIBED PATH (FORWARD DIRECTION FOR FRONT END OF VEHICLE AND REVERSED DIRECTION FOR REAR/AFT END OF VEHICLE), EACH FIXED NARROWBEAM TRANSEIVER HAVING A PRESCRIBED ACQUISITION POSITION AND A PRESCRIBED HANDOFF POSITION FOR A MOBILE NARROWBEAM TRANSCEIVER

74

IN EACH FIXED TRANSCEIVER CONTROLLER STORE CORRESPONDING EXPECTED ACQUISITION POSITION OF MOBILE NARROWBEAM TRANSCEIVER FOR TRAVELING VEHICLE(S) (OPTIONAL: STORE HANDOFF POSITIONS, SCHEDULED ARRIVAL OR CONFIGURE VEHICLE DETECTION)

76

STORE PRESCRIBED PATH OF FIXED NARROWBEAM TRANSCEIVERS (INCLUDING RESPECTIVE ACQUISITION POSITIONS AND HANDOFF POSITIONS, AND ESTIMATED ACQUISITION TIMES) IN EACH MOBILE TRANSCEIVER CONTROLLER (E.G., FORWARD-DIRECTION POSITIONS FOR FORWARD CONTROLLER, REVERSED-DIRECTION POSITIONS FOR REAR/AFT CONTROLLER)

FIG. 4

HIGH-SPEED MOBILE BROADBAND ACCESS BY SLEWING BETWEEN VEHICULAR NARROWBEAM TRANSCEIVER AND FIXED TRANSCEIVERS ALONG PRESCRIBED PATH

TECHNICAL FIELD

The present disclosure generally relates to providing broadband network access in mobile vehicles such as high speed passenger trains.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Travelers are becoming increasingly demanding of the availability of Internet access aboard movable vehicles such as airplanes, buses, ships, and inter-city trains. Current Internet access is offered aboard airplanes that utilize satellite links and/or sky-to-ground links for connection from the airplane to the Internet. Internet access for trains suffers from significant bandwidth limits, such that rail-based Internet access systems typically disable bandwidth intensive applications, causing customer dissatisfaction.

BRIEF DESCRIPTION OF THE DRAWINGS

Reference is made to the attached drawings, wherein elements having the same reference numeral designations represent like elements throughout and wherein:

FIG. 4 illustrates an example method of deploying narrowbeam transceivers to enable continuous broadband access between a vehicle and a wide-area network as the vehicle travels along a prescribed path, according to an example embodiment.

DESCRIPTION OF EXAMPLE EMBODIMENTS

Overview

In one embodiment, a method comprises: establishing a first broadband data link between a first mobile narrowbeam transceiver positioned on a vehicle and a first fixed narrowbeam transceiver mounted along a prescribed path of the vehicle; and switching from the first broadband data link, by the first mobile narrowbeam transceiver, to a second broadband data link with a second fixed narrowbeam transceiver mounted along the prescribed path after the first fixed narrowbeam transceiver, enabling the vehicle to maintain continuous broadband access to a wide area network via a prescribed sequence of the fixed narrowbeam transceivers along the prescribed path.

In another embodiment, an apparatus comprises a first mobile narrowbeam transceiver and a processor circuit. The first mobile narrowbeam transceiver is positioned on a vehicle and configured for establishing a first broadband data link with a first fixed narrowbeam transceiver mounted along a prescribed path of the vehicle. The processor circuit is configured for causing the first mobile narrowbeam transceiver to switch from the first broadband data link to a second broadband data link with a second fixed narrowbeam transceiver mounted along the prescribed path after the fixed narrowbeam transceiver, enabling the vehicle to maintain continuous broadband access to a wide area network via a prescribed sequence of the fixed narrowbeam transceivers along the prescribed path.

In yet another embodiment, logic is encoded in one or more non-transitory tangible media for execution and when executed by a machine operable for: establishing a first broadband data link between a first mobile narrowbeam transceiver positioned on a vehicle and a first fixed narrowbeam transceiver mounted along a prescribed path of the vehicle; and switching from the first broadband data link, by the first mobile narrowbeam transceiver, to a second broadband data link with a second fixed narrowbeam transceiver mounted along the prescribed path after the first fixed narrowbeam transceiver, enabling the vehicle to maintain continuous broadband access to a wide area network via a prescribed sequence of the fixed narrowbeam transceivers along the prescribed path.

DETAILED DESCRIPTION

Particular embodiments enable high-speed vehicles (e.g., high-speed trains traveling up to 320 kilometers per hour (kph) or HyperLoop trains expected to travel 1000 kph or higher) to maintain continuous broadband access with a wide-area network, based on one or more mobile narrowbeam transceivers mounted on the vehicle switching broadband data links with a prescribed sequence of fixed narrowbeam transceivers mounted along a prescribed path of the vehicle.

Figure 1:
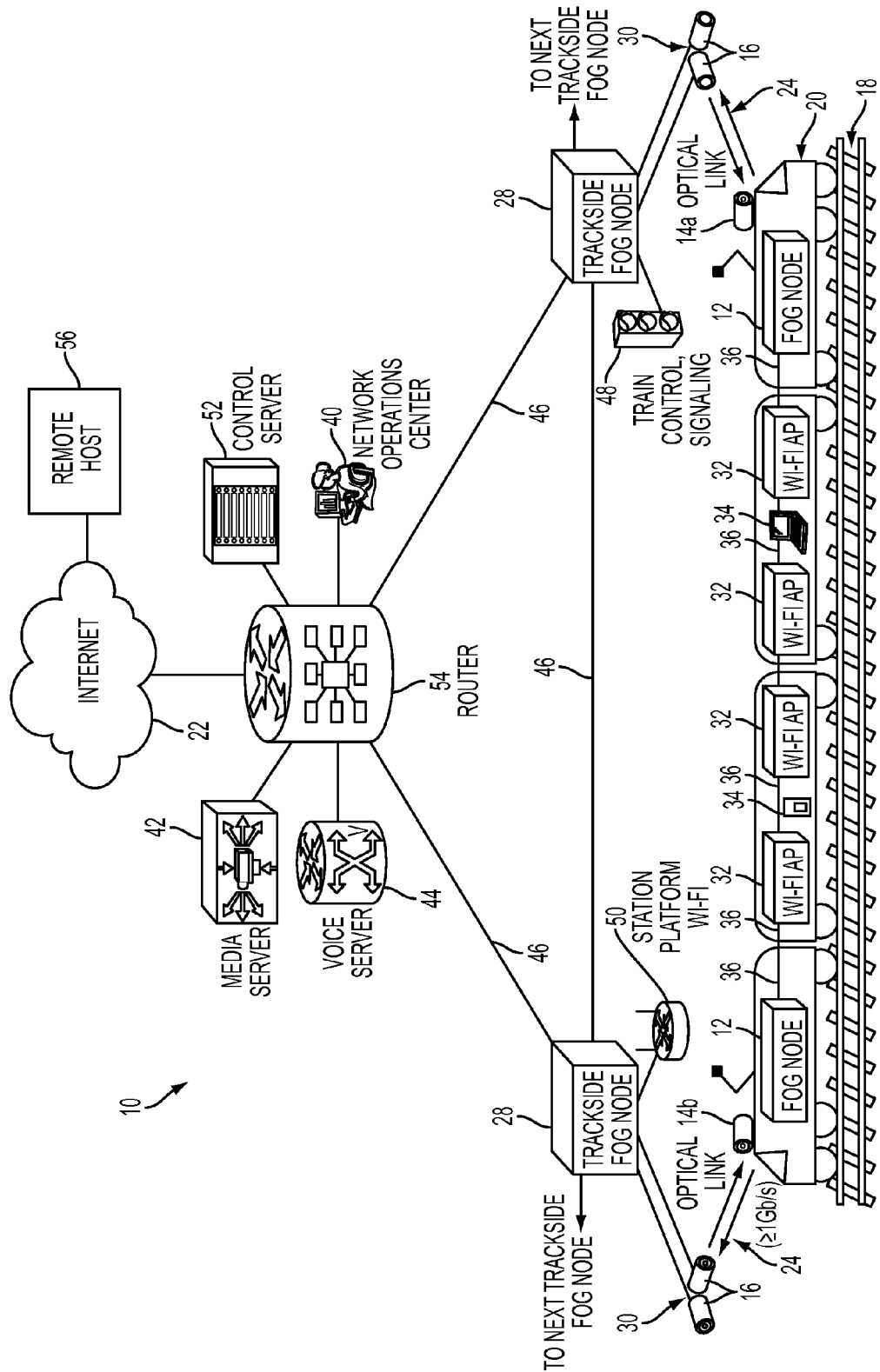
FIG. 1 illustrates an example system enabling a vehicle to maintain continuous broadband access to a wide area network as the vehicle passes a prescribed sequence of fixed narrowbeam transceivers along a prescribed path of the vehicle, according to an example embodiment.

FIG. 1 is a diagram illustrating an example system 10 enabling a vehicle to maintain continuous broadband access to a wide area network as the vehicle passes a prescribed sequence of fixed narrowbeam transceivers along a prescribed path of the vehicle, according to an example embodiment. In particular, FIG. 1 illustrates an example system 10 having one or more apparatus 12 and/or 28 for causing switching of a mobile narrowbeam transceiver 14 from first to second fixed narrowbeam transceivers 16 along a prescribed path 18, enabling a vehicle 20 traveling along the prescribed path 18 to maintain continuous broadband access to a wide area network 22. Each narrowbeam transceiver 14, 16, can be configured for establishing a broadband data link 24 of one (1) Gigabit per second (1 Gb/s) or more, based on establishing highly directional wireless links. Examples of highly directional wireless links can include an optical link using collimated light providing a beam spread of no more than 1 to 2 meters per kilometer transit distance (i.e., 0.1 to 0.2 percent beam spread or less), or a radio frequency (RF) link having a wavelength of no more than one (1) centimeter (i.e., a centimeter-or-smaller wave link).

Each narrowbeam transceiver 14, 16 can be dynamically positioned by galvanometers (26 of FIG. 2) or beam deflectors that can deflect the narrowbeam transmission by a slew angle of about 10 to 20 degrees at a slew time of about 10 milliseconds or less (e.g., 1 millisecond). An example implementation of the narrowbeam transceivers 14, 16 and galvanometers/beam deflectors can include the commercially available optical heads by Cambridge Technology, Bedford, Mass. (available on the World Wide Web at the website address "www.camtech.com"). Other beam deflection techniques also could be used (e.g., stepper motors, piezoelectric actuators, phased antenna arrays, etc.)

Figure 2:
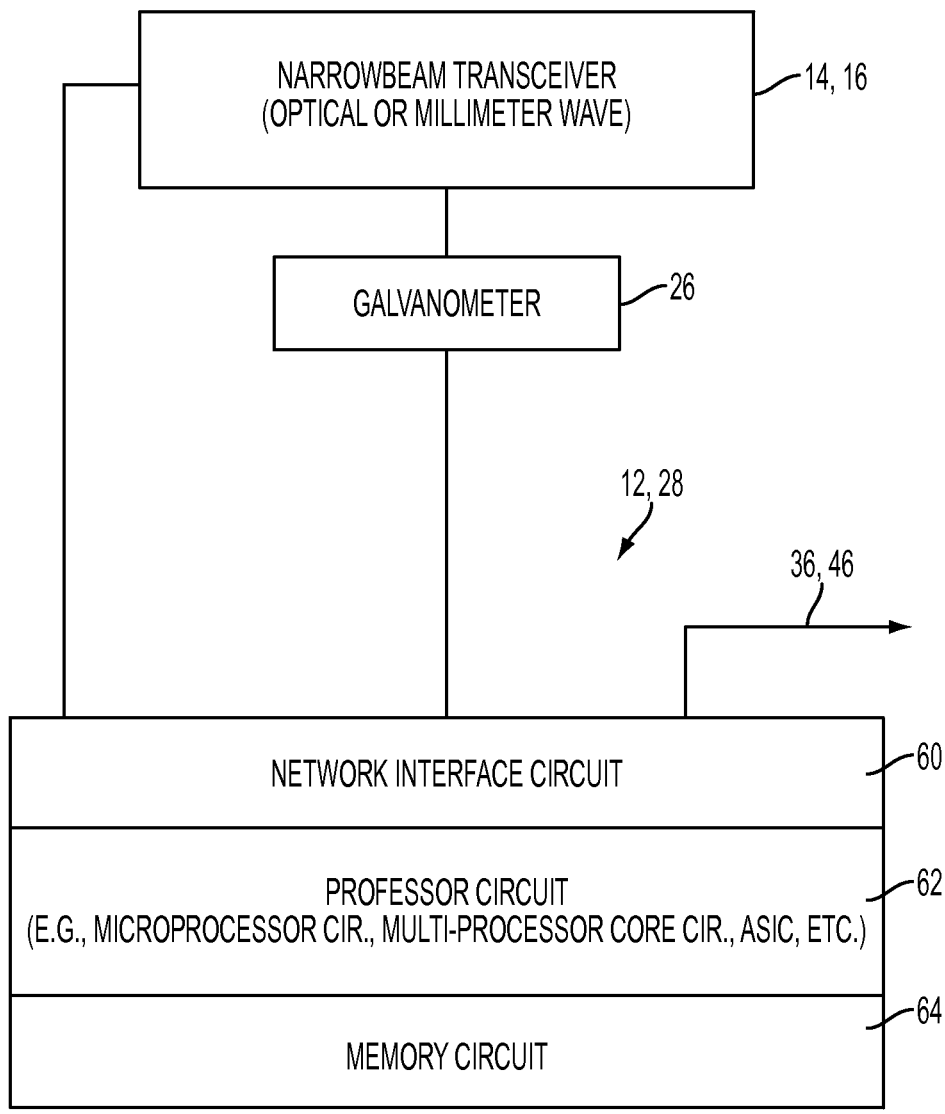
FIG. 2 illustrates an example controller device used by the vehicle or a fixed narrowbeam transceiver for maintaining continuous broadband access between the vehicle and a wide-area network, according to an example embodiment.

The dynamic positioning of the highly directional wireless links by each narrowbeam transceiver 14, 16 during movement of the vehicle 20 along the prescribed path 18 can be controlled by a transceiver controller device 12, 28 (also referred to as a "fog node", described below), that controls the galvanometer/beam deflector 26 of the corresponding narrowbeam transceiver 14, 16. Each transceiver controller device 14, 16, can be configured with prescribed positions 30 for locating each counterpart narrowbeam transceiver 14, 16 as a vehicle 20 travels along a prescribed path 18. As illustrated in FIG. 2, each vehicle 20 mounted with a mobile narrowbeam transceiver 14 is assumed to travel along a prescribed path 18, for example a constrained physical path such as train tracks for a train or a physical or navigational boundaries in a waterway for a marine vessel, one to two motor vehicle lanes of a motor vehicle highway (e.g., a multilane interstate highway), etc.; a prescribed path also could be provided based on regulatory constraints or voluntary constraints required for use of the continuous broadband access, for example an airborne vehicle following a constrained flight path or a motor vehicle staying in one or two motor vehicle lanes advertised with accompanying signage as providing continuous broadband access as described herein. Hence, a prescribed sequence of fixed narrowbeam transceivers can be fixed (i.e., securely fastened) at positional coordinates along the prescribed path of the vehicle, enabling the respective positional coordinates of the prescribed sequence of fixed narrowbeam transceivers to be configured (e.g., programmed, stored, etc.) into each transceiver controller device in a vehicle.

Figure 3A:
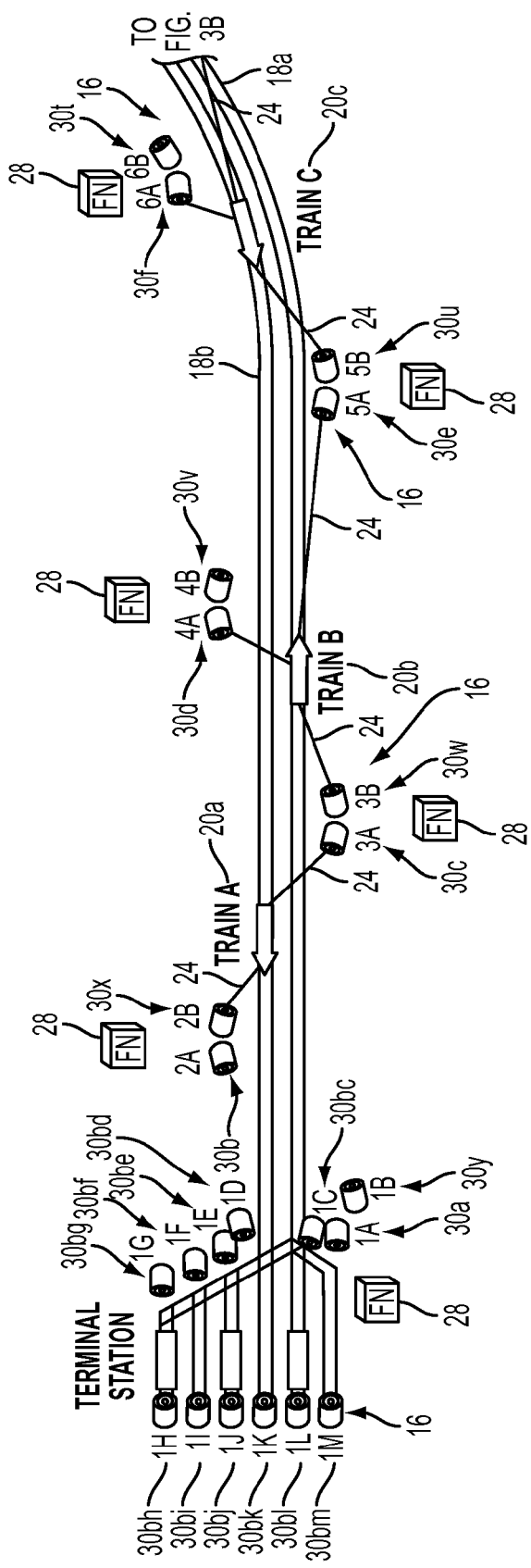
FIGS. 3A and 3B illustrate an example deployment of fixed narrowbeam transceivers at prescribed positions along a prescribed path of a vehicle, according to an example embodiment.
Figure 3B:
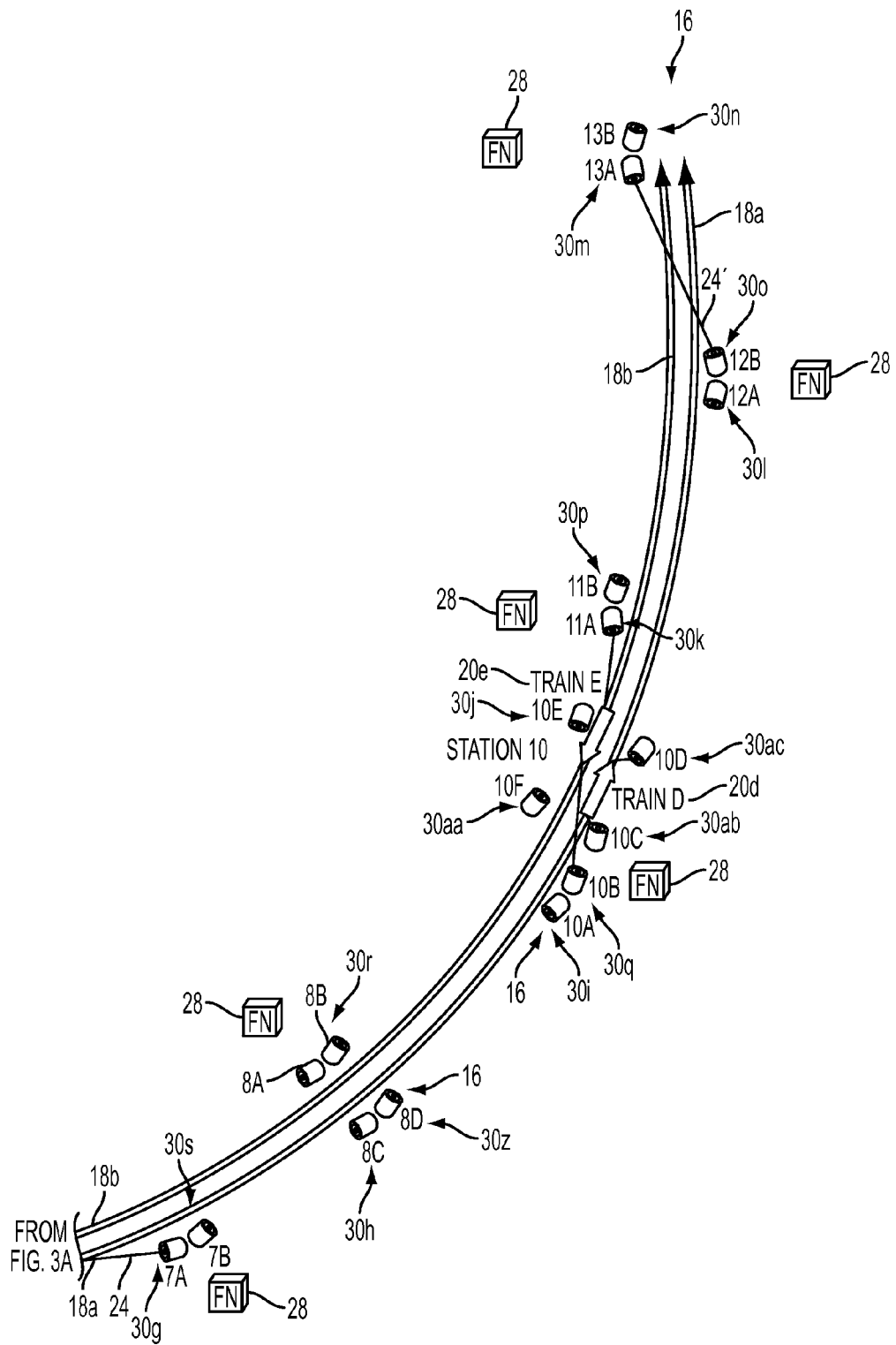

As illustrated in FIGS. 3A and 3B, the train 20*b* traveling along the "Eastward" prescribed path 18*a* can pass the fixed narrowbeam transceivers 16 in a prescribed sequence. The example train 20 of FIG. 1 can include a mobile narrowbeam transceiver 14 mounted in a forward direction (e.g., 14*a* of FIG. 1), and a second mobile narrowbeam transceiver 14 mounted in a reversed direction (e.g., 14*b* of FIG. 1) relative to the prescribed path 18 traveled by the train 20. Hence, the forward-facing mobile narrowbeam transceiver 14*a* for a train 20 (e.g., 20*b* of FIG. 3A) traveling along the "Eastward" prescribed path 18*a* can switch along the fixed narrowbeam transceivers (e.g., "1A") 16 at the respective positions (e.g., "30*a*") according to a prescribed sequence, for example the example prescribed sequence of transceiver 1A at 30*a*, transceiver 2A at 30*b*, transceiver 3A at 30*c*, transceiver 4A at 30*d*, transceiver 5A at 30*e*, transceiver 6A at 30*f*, transceiver 7A at 30*g* (see FIG. 3B), transceiver 8C at 30*h*, transceiver 10A at 30*i*, transceiver 10E at 30*j*, transceiver 11A at 30*k*, transceiver 12A at 30*l*, and transceiver 13A at 30*m*, etc. The reversed-facing mobile narrowbeam transceiver 14*b* for a train 20 (e.g., 20*b* of FIG. 3A) traveling along the "Eastward" prescribed path 18*a* also can switch along the fixed narrowbeam transceivers 16 that are "fixed" (i.e., installed or deployed) at the respective positions according to an example prescribed sequence of transceiver 1B at 30*y*, transceiver 2B at 30*x*, transceiver 3B at 30*w*, transceiver 4B at 30*v*, transceiver 5B at 30*u*, transceiver 6B at 30*t*, transceiver 7B at 30*s*, transceiver 8D at 30*z*, transceiver 10B at 30*q*, transceiver 10F at 30*aa*, transceiver 11B at 30*p*, transceiver 12B 30*o*, and transceiver 13B at 30*n*, etc. Similar prescribed sequences of fixed narrowbeam transceivers 16 can be established and programmed into the controller devices 12 and 28 for the forward-facing transceiver 14*a* and reversed-facing transceiver 14*b* on a train 20 (e.g., 20*e* of FIG. 3B) traveling in the "Westward" prescribed path 18*b* (i.e., in the opposite direction of the prescribed path 18*a*).

As used herein, the term "fixed" for "fixed narrowbeam transceiver" 16 refers solely to the installation, mounting, deployment, etc. of the narrowbeam transceiver 16 at a fixed deployment position (e.g., at a prescribed X-Y-Z coordinate) 30, as opposed to the "mobile narrowbeam transceiver" 14 that moves along the prescribed path 18 with the vehicle 20; hence, a "fixed narrowbeam transceiver" 16 can be configured to be movable (e.g., rotate) about its X axis, Y axis and/or Z axis at its corresponding fixed deployment position 30 (e.g., the fixed narrowbeam transceiver 16 is bolted to a pole), but is otherwise not "mobile" because the fixed narrowbeam transceiver does not move from its fixed deployment position (e.g., does not move from the prescribed X-Y-Z coordinate), else the corresponding prescribed position needs to be updated in the transceiver controller devices 12 and/or 28.

In one embodiment, the switching of the mobile narrowbeam transceiver 14 between fixed narrowbeam transceivers 16 can be based solely on the vehicular transceiver controller device 12 controlling the galvanometers 26 for slewing the mobile narrowbeam transceiver 14 between fixed narrowbeam transceivers 16 that do not move or rotate about any axis. In another embodiment, the switching of the mobile narrowbeam transceiver 14 between fixed narrowbeam transceivers 16 can be based solely on the transceiver controller devices 28 controlling the galvanometers 26 for the respective fixed narrowbeam transceivers 16 to slew toward the mobile narrowbeam transceiver 14 during movement of the vehicle toward a prescribed handoff position and/or a prescribed acquisition position, for example assuming a mobile narrowbeam transceiver 14 is immovable and does not slew or rotate relative to its mounted position on the vehicle 20. In another embodiment, both the mobile narrowbeam transceiver 14 and the fixed narrowbeam transceiver 16 can slew to the appropriate positions for handoff, acquisition and tracking of the corresponding peer transceiver, under coordinated control of the respective controller devices 12 and 28.

Consequently, a transceiver controller device ("fog node") 12 and/or 28 can detect that the vehicle 20 has moved to a prescribed handoff position along the prescribed path 18*a*, and in response control the corresponding galvanometer (26 of FIG. 2) to slew a narrowbeam transceiver 14 and/or 16 to a prescribed acquisition position to establish a broadband link. For example, a transceiver controller device 12 can respond to detecting the vehicle 20 has moved to a prescribed handoff position based on controlling the corresponding galvanometer 26 to slew the mobile narrowbeam transceiver (e.g., 14*a*) to a prescribed acquisition position and establish a broadband data link with a first fixed narrowbeam transceiver (e.g., 4A at position 30*d*) 16 mounted along the prescribed path 18*a* of the vehicle. Similarly, the transceiver controller device 28 can respond to detecting a vehicle 20 arriving toward a prescribed acquisition position for a local fixed narrowbeam transceiver 16 by slewing the fixed narrowbeam transceiver 16 into the appropriate acquisition position in anticipation of establishing the wireless broadband data link 24.

The transceiver controller device 12 also can control the continuous movement of the mobile narrowbeam transceiver (e.g., 14*a*) by the galvanometer 26 to maintain the broadband data link 24 with the fixed narrowbeam transceiver 16 as the vehicle 20 moves along the prescribed path 18; similarly, the transceiver controller device 28 can control the continuous movement of the fixed narrowbeam transceiver 16 to maintain the broadband data link 24 with the mobile narrowbeam transceiver 14 as the vehicle moves along the prescribed path 18 from the acquisition position of the fixed narrowbeam transceiver to the handoff position of the fixed narrowbeam transceiver 16. In response to the transceiver controller device 12 detecting the vehicle 20 has moved to the next prescribed handoff position along the prescribed path 18*a*, the transceiver controller device 12 can control the galvanometer 26 to slew the mobile narrowbeam transceiver 14 to the next prescribed acquisition position and establish another broadband data link 24 with the next fixed narrowbeam transceiver (e.g., 5A at position 30*e*) mounted along the prescribed path (e.g., 18*a*).

The transceiver controller devices 28 for the fixed narrowbeam transceivers 16 mounted along the prescribed path of the vehicle also can optionally be configured with prescribed acquisition positions (under the control of the trackside transceiver controller devices 28) for detecting a mobile narrowbeam transceiver 14 traversing along the prescribed path 18, and/or a prescribed acquisition time based on a prescribed schedule (e.g., a train schedule) and/or sensor information indicating arrival of the vehicle 20 to the prescribed acquisition position. Hence, the configuring of the transceiver controller devices 12, 28 with precise acquisition positions enables the mobile narrowbeam transceivers 14 to switch from a first broadband data link 24 provided by a first fixed narrowbeam transceiver 16 to a second broadband data link 24 with a second fixed narrowbeam transceiver 16 mounted along the prescribed path, enabling the vehicle 20 to maintain continuous broadband access to a wide-area network 22 via the prescribed sequence of fixed narrowbeam transceivers along the prescribed path. The transceiver controller devices 12, 28 also can exchange network control messages via the broadband data link 24 to coordinate the precise handoff time (i.e., the exact time instance in which handoff is to be initiated).

FIG. 1 also illustrates additional components associated with routing of data traffic to and from the vehicle 20 via the continuous broadband access provided by the broadband data links 24, according to an embodiment. For example, the vehicle 20 can be a high speed rail "consist" (i.e., a set of railroad cars and locomotives semi-permanently connected) for a high speed rail line (e.g., French TGV Duplex, Japan Shinkansen, Chinese "Harmony", U.S. "Acela Express", etc.) having an overall length of 400 meters and comprising four power cars, and sixteen (16) carriage cars having seats for approximately 1024 passengers. Assuming that twenty five percent of the riders simultaneously are using bandwidth-intensive applications such as HD video streaming, web phones, gaming application downloads, or cloud-based applications (the remaining passengers sleeping, reading, sharing an active user's screen, etc.), then the worst case bandwidth requirements would be 256 users*6 Mb/s per user, or 1.536 Gb/s; additional data (e.g., signaling, security camera backhaul, crew communications, telemetry, energy management, overhead, etc.) demonstrates that a desirable bandwidth requirement for the train is about 2 Gb/s.

The vehicle 20 can include wireless access points ("Wi-Fi AP") 32 offering wireless access to client devices 34, for example two access points 32 per train car providing IEEE 802.11n/802.11 ac links (with backwards compatibility for slower Wi-Fi standards). Wired network connections also can be offered to passengers (e.g., band limited up to 6 Mb/s). The wireless access points (and/or wired user access points) 32 can be connected to one or more transceiver controller devices 12 via a wired network connection, for example a wired Gigabit Ethernet link 36. Hence, client devices 34 can enjoy a THX certified quality video stream using an H.264 codec (commercially available from Eye IO LLC) at 6 Mb/s.

Each vehicle 20 can include one or more vehicle-mounted transceiver controller devices 12. Each vehicle-mounted transceiver controller device 12 can be configured as a vehicular "fog node" that controls network traffic aboard the vehicle 20, including routing of data traffic between the user devices 34, onboard control systems, etc., and the available mobile narrowbeam transceivers 14*a* and/or 14*b*. As described in further detail below, one or more vehicle-mounted transceiver controller devices 12 can slew the mobile narrowbeam transceivers 14 into the appropriate positions for acquisition of a broadband data link 24 with a fixed narrowbeam transceiver 16, maintaining the broadband data link 24 with the fixed narrowbeam transceiver 16 as the vehicle 20 moves along the prescribed path 18, and switching to the next fixed narrowbeam transceiver 16 in response to detecting the vehicle 20 has moved to a prescribed handoff position along the prescribed path 18.

The one or more vehicle-mounted transceiver controller devices 12 also can control whether vehicular traffic is output via the forward transceiver 14*a* and/or the reversed transceiver 14*b*. For example, the one or more vehicle-mounted transceiver controller devices 12 can control routing of traffic between the transceivers 14*a* and 14*b* when the respective broadband data links established by the forward transceiver 14*a* and the reversed transceiver 14*b* are concurrently available, providing an aggregate bandwidth of over 2 Gb/s via the two available 1 Gb/s (or higher) links 24. The one or more vehicle-mounted transceiver controller devices 12 also can reroute vehicular data traffic from one mobile narrowbeam transceiver 14*a* to the other narrowbeam transceiver 14, for example in response to detecting the one narrowbeam transceiver 14*a* is approaching the prescribed handoff position resulting in the one narrowbeam transceiver 14*a* about to perform a handoff. The one or more vehicle-mounted transceiver controller devices 12 also can temporarily buffer data traffic in a memory circuit 64 (illustrated in FIG. 2) while a narrowbeam transceiver 14 is about to perform a handoff.

The one or more vehicle-mounted transceiver controller devices 12 also can execute other fog-computing based operations that are specific to the vehicle 20, for example providing passenger services (e.g., view current location, estimated time of arrival at destination, ticket purchase, description of local points of interest, caching popular media content such as movies, retrieve media content from a nearby media content server device 42, offer Voice over IP services via a voice server device 44, etc.). The one or more vehicle-mounted transceiver controller devices 12 also can control and transmit vehicle telemetry, surveillance camera data, etc. to a network operations center 40. Other operations executable by the one or more vehicle-mounted transceiver controller devices 12 can include network-related activities, for example network authentication, bandwidth control, quality of service (QoS) management and enforcement, security, handoff, fault recovery, etc. Other services can be provided by the vehicle-mounted transceiver controller devices 12 directed to user services and/or vehicle management.

Each transceiver controller device 28, also referred to as a "trackside fog node", can be configured for controlling one or more fixed narrowbeam transceivers 16, including controlling slewing for acquisition and maintaining a wireless broadband data link 24 with a mobile narrowbeam transceiver 14, coordinating handoff operations between fixed narrowbeam transceivers 16, and rerouting network traffic among the fixed narrowbeam transceivers 16 as a mobile narrowbeam transceiver switches between the prescribed sequence of narrowbeam transceivers 16 along the prescribed path 18. Multiple transceiver controller devices 28 also can coordinate various operations via high speed wired data links 46 providing 10 Gb/s to 40 Gb/s or higher connections, including handoff and associated network traffic rerouting operations as the mobile narrowbeam transceivers handoff between the prescribed sequence of fixed narrowbeam transceivers 16 along the prescribed path 18 of the vehicle. Each transceiver controller device 28 also can be configured for executing services complementary to the continuous broadband access between the vehicle 20 and the wide area network 22, including executing maintenance, diagnostic and control operations on the fixed narrowbeam transceivers 16 (described below), executing control of train control and signaling devices 48 used to notify vehicles of traffic commands (green/normal speeds, yellow/caution, red/stop), providing local Wi-Fi services 50 for passengers at a station platform, etc. The operations executed by the transceiver controller devices 28 as described herein can be centrally coordinated by a control server device 52, and connectivity within the system 10 can be established by one or more Internet Protocol (IP) based router devices 54 configured for routing data packets to and from the vehicle 20 via the transceiver controller devices 28. For example, the router device 54 can forward data packets received from the vehicle 20 via the transceiver controller devices 28 to a destination device 56 via the wide area network 22, to the voice server device 44, the media server device 42, the network operations center 40, and/or the control server device 52, as appropriate. The router device 54 also can forward data packets from any one of the devices 40, 42, 44, 52, 56 to the appropriate transceiver controller device 28 for delivery to the appropriate broadband data link 24. In an alternate embodiment, the coordinated execution by the transceiver controller devices 28 and the control server device 52 as described herein can be implemented according to a cloud computing architecture.

FIG. 2 illustrates an example apparatus 12 and/or 28 configured for controlling a narrowbeam transceiver 14 or 16 to maintain a continuous broadband access for a vehicle 20 traveling along a prescribed path 18, according to an example embodiment. The apparatus 12 or 28 is a physical machine (i.e., a hardware device) configured for implementing network communications with other physical machines (e.g., 34, 40, 42, 44, 54, and 56) via the network 10. Hence, the apparatus 12 and/or 28 is a network-enabled machine implementing network communications via the network 10. The apparatus 12 and/or 28 also can include the narrowbeam transceiver 14 and/or 16, and the galvanometer 26; in other words, apparatus 12 and/or 28 can be integrated with the narrowbeam transceiver 14/16 and the corresponding galvanometer 26 into a single hardware device.

The apparatus 12 and/or 28 can include a network interface circuit 60, a processor circuit 62, and a memory circuit 64. The network interface circuit 60 can include one or more distinct physical layer transceivers for communication with any one of the galvanometer 26 and/or the narrowbeam transceiver 14/16; the network interface circuit 60 also can include an IEEE based Ethernet transceiver for communications with the devices of FIG. 1 via a wired Ethernet link 36 or 46, and/or a fiber optic transceiver, etc. The processor circuit 62 can be configured for executing any of the operations described herein, and the memory circuit 64 can be configured for storing any data or data packets as described herein, for example storage of data packets in a buffer during handoff by the narrowbeam transceiver 14/16. The storage of data packets during handoff also can be implemented in another memory circuit distinct from the apparatus 12/28, for example an external storage unit such as a solid state drive.

Any of the disclosed circuits (including the network interface circuit 60, the memory circuit 64, the processor circuit 62, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 64) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 64 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 64 can be implemented dynamically by the processor circuit 62, for example based on memory address assignment and partitioning executed by the processor circuit 62.

Figure 5:
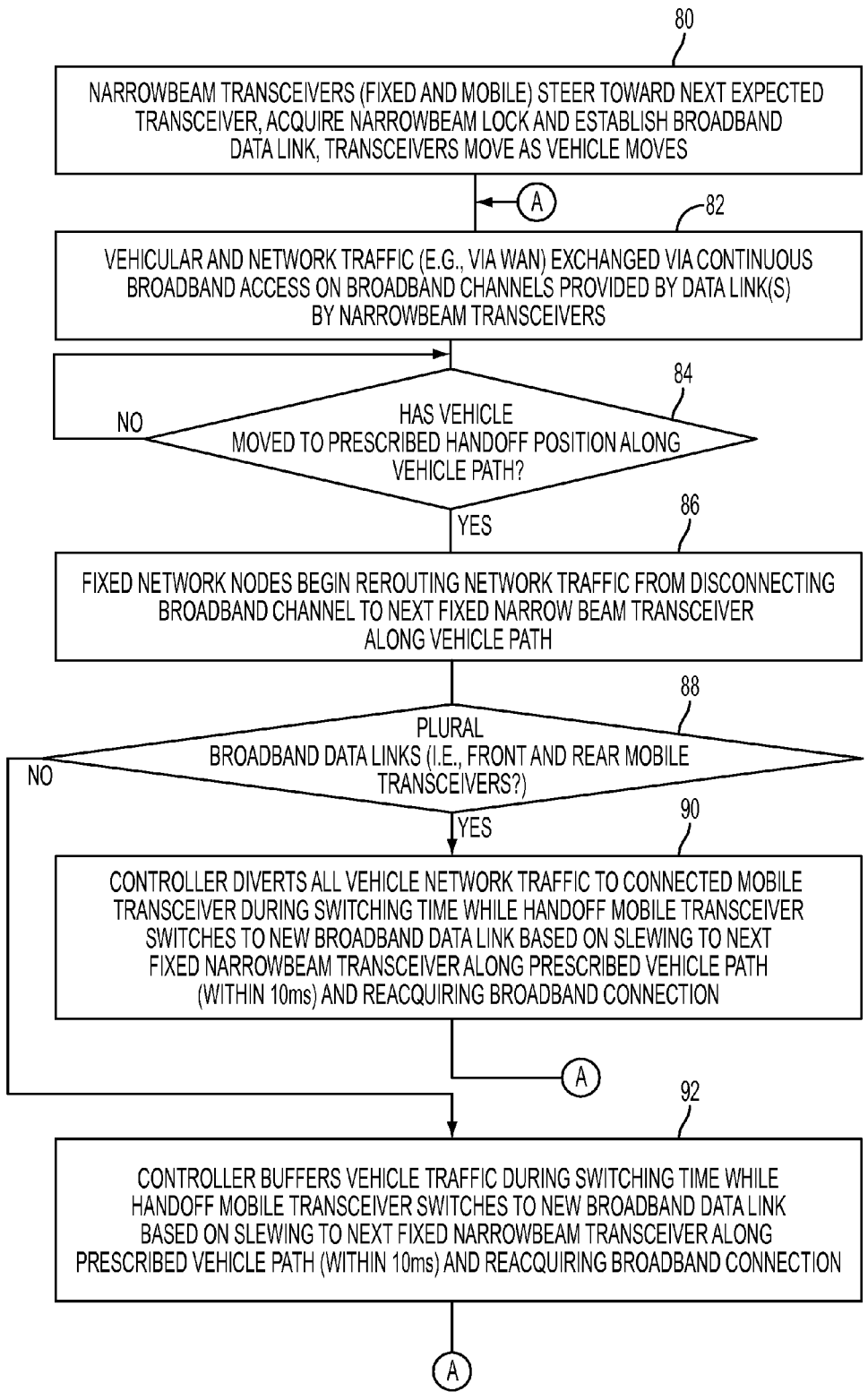
FIG. 5 illustrates an example method of maintaining continuous broadband access between a vehicle and a wide-area network based on one or more mobile narrowbeam transceivers switching between fixed narrowbeam transceivers mounted along the prescribed path of the vehicle, according to an example embodiment.

FIG. 4 illustrates an example method of deploying narrowbeam transceivers to enable continuous broadband access between a vehicle and a wide-area network as the vehicle travels along a prescribed path, according to an example embodiment. FIG. 5 illustrates an example method of maintaining continuous broadband access between a vehicle and a wide-area network based on one or more mobile narrowbeam transceivers switching between fixed narrowbeam transceivers mounted along the prescribed path of the vehicle, according to an example embodiment. The operations described any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 4, an example method of deploying narrowbeam transceivers to enable continuous broadband access can include identifying prescribed positions of the fixed narrowbeam transceivers 16 along a prescribed vehicle path 18 in operation 70.

For example, each broadband data link 24 is configured to provide at least one gigabit per second or higher, based on configuring the narrowbeam transceivers for transmitting and/or receiving collimated light having a beam spread of 0.1 to 0.2 percent or less, or an RF carrier having a wavelength of one centimeter or less.

The transceivers 14, 16 the controller devices 12, 28 and the galvanometers 26 also are configured to ensure that a mobile narrowbeam transceiver 14 can slew from a first fixed narrowbeam transceiver (e.g., 3A at location 30*c* of FIG. 3A) 16 to a second fixed narrowbeam transceiver (e.g., 4A at location 30*d*) 16 at a slew angle of about 10 degrees or less, and at a slew time of on the order of tens of milliseconds, preferably about 10 milliseconds or less (e.g., 1 millisecond). Providing a slew time of about 10 milliseconds or less (e.g., within about 1 millisecond) with a slew angle of 10 degrees during handoff between fixed and mobile narrowbeam transceivers for a high-speed vehicle 20 (e.g., a high-speed train) traveling at 320 kilometers per hour enables the switching time during handoff to be substantially less than the corresponding connected time interval for the mobile narrowbeam transceiver 14. In particular, assuming a high-speed train 20 is traveling at 320 kilometers per hour, a continuous broadband access can be maintained at a first data rate of about 1 Gb/s (e.g., 0.90 to 0.94 Gb/s) or more using solely a single mobile narrowbeam transceiver 14 on each vehicle, based on maintaining the communication via the broadband data link 24 for a minimum connected time interval (e.g. 16 seconds) at a data rate of at least 1 Gb/s, and buffering the data traffic during the switching time (e.g., worst case one second or less) during handoff where the mobile narrowbeam transceiver switches from the first broadband data link 24 of the first fixed narrowbeam transceiver 16 to the next fixed narrowbeam transceiver 16. Hence, assuming a minimum average connected time interval of 16 seconds and a switching time of 1 second or less, then the switching time is substantially less than each corresponding connected time interval on the order of 6 percent or less.

Hence, the prescribed positions 30 of the fixed narrowbeam transceivers 16 can ensure that mobile narrowbeam transceiver 14 can maintain a broadband data link 24 for at least 16 seconds, and execute a handoff within one second or less with the fixed narrowbeam transceivers 16. Consequently, the fixed narrowbeam transceivers 16 are deployed at positions 30 equating to 17 seconds apart for the maximum nominal speed of the vehicle 20, e.g. about 1500 meters apart for a train moving at 320 kilometers per hour. In certain situations where topography or weather conditions (e.g., prolonged periods of heavy rain, hilly conditions, sharp curves etc.) require the fixed narrowbeam transceivers 16 to be spaced closer than 1500 meters, certain adjustments can be made with respect to optimizing the locations 30 relative to the guaranteed data rate for the continuous broadband access, the slew rate and slew angle available by the narrowbeam transceivers 14 and/or 16, and the speed of the train 20 through the specific locations 30 (e.g., a train may reduce its speed at hilly locations or at sharper curves). As illustrated in FIG. 3B, additional transceivers "8A, 8B, 8C, and 8D" can be added to accommodate the sharp curve in the prescribed path 18*a*. In such cases, acceptable continuous broadband access can be maintained based on the switching time being substantially less than the corresponding connected time interval, i.e., if the average ratio between switching time and connection time is 10% or less (e.g., on average 1 second handoff every 10 seconds).

Improved performance at higher data rates for the continuous broadband access can be achieved if the vehicle includes a mobile narrowbeam transceiver mounted in a forward direction (e.g., 14*a*) relative to the prescribed position, and a second mobile narrowbeam transceiver mounted in the reversed direction (e.g., 14*b*). As illustrated in operation 70, deploying fixed narrowbeam transceivers 16 in "offset" positions relative to forward and reverse-direction mobile narrowbeam transceivers ensures that either both mobile narrowbeam transceivers 14*a* and 14*b* concurrently have established a broadband data link, or one mobile narrowbeam transceiver (e.g., 14*a*) maintains its broadband data link 24 while the other mobile narrowbeam transceiver (e.g., 14*b*) performs a handoff.

Hence, the fixed narrowbeam transceivers 16 are deployed (operation 72) in a prescribed sequence at prescribed positions 30 along the prescribed path 18, for example 1-2 meters above the height of the mobile narrowbeam transceiver 14 mounted at the top of the vehicle 20. The prescribed position can be specified in various coordinates, as appropriate, for example X-Y (assuming constant height Z), in a coordinate system where X defines the position along the prescribed path 18 (e.g., the position on the track), Y defines the position orthogonal to the prescribed path 18 (e.g., near the track edge or further away from the track edge), and Z defines the position above the prescribed path 18 (e.g., height above the track). Each fixed narrowbeam transceiver 16 can have a prescribed acquisition position (e.g., 1700 meters before the position of the transceiver 16) and a prescribed handoff position (e.g., 200 meters before the position of the transceiver) for a mobile narrowbeam transceiver 14 traveling along the prescribed path.

Additional fixed narrowbeam transceivers 16 can be deployed at stations where a vehicle 20 may be stopped to load/unload passengers to accommodate for building structures, obstructions (e.g., other stationary trains), etc. As illustrated in FIG. 3A, the terminal station can include additional transceivers 16 for each track (e.g., 1C at 30*bc*, 1D at 30*bd*, 1E at 30*be*, 1F at 30*bf*, 1G at 30*bg*, 1H at 30*bh*, 1I at 30*bi*, 1J at 30*bj*, 1K at 30*bk*, 1L at 30*bl*, and 1M at 30*bm*). As illustrated in FIG. 3B, the station "10" can include additional fixed narrowbeam transceivers "10C, 10D, 10E, and 10F" (at respective locations 30*ab*, 30*ac*, 30*j*, and 30*aa*) to accommodate for any other train that may obstruct other transceivers 16.

Hence, in operation 74 each fixed transceiver controller device 28 can store in its memory circuit 64 the acquisition positions of each mobile narrowbeam transceiver 14, enabling pre-positioning of the fixed transceivers 16 in preparation for acquisition by the mobile narrowbeam transceiver 14 as the vehicle 20 arrives. The fixed transceiver controller device also can store handoff positions, scheduled arrival times, or configure vehicle detection using sensor data, etc. to more precisely initiate acquisition as the mobile narrowbeam transceiver 14 arrives to its acquisition position.

Similarly, in operation 76 the positions 30 in the prescribed path 18 of fixed narrowbeam transceivers 16 can be stored in the memory circuit 64 of each vehicular transceiver controller device 12, including the respective acquisition positions, handoff positions, etc. of each fixed narrowbeam transceiver 16. Hence, the forward-direction positions can be added to the memory circuit 64 of the forward controller device 12, and the reversed-direction positions can be added to the memory circuit 64 of the rear/aft controller device 12, enabling the controller devices 12 to anticipate when to initiate handoff by slewing from an existing fixed narrowbeam transceiver 16 to the acquisition position of the next narrowbeam transceiver 16.

FIG. 5 illustrates an example method of maintaining continuous broadband access between a vehicle 20 and a wide-area network 22 based on one or more mobile narrowbeam transceivers 14 switching between fixed narrowbeam transceivers 16 mounted along the prescribed path 18 of the vehicle, according to an example embodiment. In operation 80 one or more fixed transceiver controller devices 28 steer one or more fixed narrowbeam transceivers to the prescribed acquisition position for the next mobile narrowbeam transceiver 14, and one or more mobile transceiver controller devices 12 steer one or more mobile narrowbeam transceivers (e.g., 14*a* and/or 14*b*) to the corresponding prescribed acquisition position for the fixed narrowbeam transceiver 16. In response to a mobile transceiver—fixed transceiver pair 14/16 acquiring a narrowbeam signal lock and establishing a broadband data link 24, the respective controller devices 12 and 28 can steer the respective transceivers to maintain the broadband data link 24 as the vehicle moves. Once the broadband data link 24 is established, the vehicular and network traffic (e.g., from the wide area network 22) can be exchanged in operation 82 under the control of the controller devices 12 and 28 via the broadband channels provided by the narrowbeam transceivers 16. The controller devices 12 and 28 can maintain the broadband data link 24 as the vehicle 20 moves along the prescribed path 18 by moving the transceivers 14, 16 to maintain alignment for the broadband data link, until detecting in operation 84 that a mobile narrowbeam transceiver 14 has moved to a prescribed handoff position. In another embodiment, beam position detectors (not shown) can be implemented in the mobile transceiver 14 and each fixed transceiver 16 for acquiring and maintaining the narrowbeam signal lock (e.g., executing "fine directional lock") from the prescribed acquisition position to the next handoff position, eliminating the necessity that the controller devices 12 and 28 control the transceivers 14 and 16 in between the narrowbeam signal lock and the prescribed handoff position.

In response to the vehicle-mounted transceiver controller device 12 and/or the fixed transceiver controller device 28 detecting in operation 84 that the one of the mobile narrowbeam transceivers 14 on the vehicle 20 has moved to a prescribed handoff position, the fixed controller devices 28 can begin rerouting traffic in operation 86. For example, if in operation 88 the vehicle 20 has plural broadband data links 24 (e.g., a forward transceiver 14*a* and a reversed-direction (rear-facing) transceiver 14*b*), the controller devices 12 and/or 28 in operation 90 can divert all vehicle network traffic to the connected mobile transceiver (e.g., 14*b*) during the switching time while the handoff mobile transceiver (e.g., 14*a*) switches to the new broadband data link 24 by slewing to the next fixed narrowbeam transceiver 16 (within 10 milliseconds or less), and reacquiring the broadband connection. As described previously, the entire switching time can be one second or less.

If in operation 88 there is only one mobile narrowbeam transceiver 14 connected to a fixed narrowbeam transceiver 16, the controller devices 12 and/or 28 can reroute traffic in operation 92 based on halting network traffic on the fixed narrowbeam transceiver 16 currently connected to the mobile narrowbeam transceiver 14 about to execute handoff, buffering the halted traffic in the memory circuit 64 during handoff, and routing the buffered network traffic to the next fixed narrowbeam transceiver 16 along the vehicle path 18.

According to example embodiments, continuous broadband access to a wide area network can be provided on a high speed vehicle, with nominal data rates approaching 2 Gb/s. Hence, up to twenty five percent of all passengers on the largest capacity high-speed train (e.g., the TGV or "Train à Grande Vitesse" in France) can concurrently enjoy streaming 6 Mb/s THX quality HD video programs from Internet based media servers, with burst speeds approaching 1 Gb/s. Additional train systems and trackside systems can be integrated based on deploying the controller devices 12 and 28 within a fog computing architecture that enables network-based services to be deployed closer to the vehicle 20, as opposed to relying on computation or storage intensive services via the wide area network.

The example embodiments also offer improved maintenance and operations testing. In one example, the fixed narrowbeam transceivers (e.g., "12B" and "13A") also can establish a broadband data link 24' between themselves if no vehicle is present, for example to execute diagnostics and performance testing by a fixed transceiver controller device 28, including monitoring long term link performance such as bit error rate, etc.; data related to the diagnostic and performance testing by the fixed transceiver controller device 28 can be sent to the control server device 52 and/or the network operations center 40 for archival and analysis. The broadband data link 24' also can be used if a wired connection is unavailable, e.g., due to breakage, enabling the broadband data link 24' to bypass a network fault such as a cable cut in the wired connection.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
 establishing a first wireless optical broadband data link between a first mobile narrowbeam transceiver positioned on a land-based vehicle and a first fixed narrowbeam transceiver mounted along a prescribed path of the land-based vehicle, the first mobile narrowbeam transceiver positioned in a forward direction relative to the prescribed path to establish a forward wireless broadband channel at one Gigabit per second (1 Gb/s) or more;
 maintaining the forward wireless broadband channel based on switching from the first wireless optical broadband data link, by the first mobile narrowbeam transceiver, to a second wireless optical broadband data link with a second fixed narrowbeam transceiver mounted along the prescribed path after the first fixed narrowbeam transceiver based on slewing of at least one of the first mobile narrowbeam transceiver on the land-based vehicle, the first fixed narrowbeam transceiver, or the second fixed narrowbeam transceiver, at a slew rate of one degree per millisecond or faster;
 establishing a reverse wireless broadband channel at one Gigabit per second (1 Gb/s) or more based on establishing a third wireless optical broadband data link between a second mobile narrowbeam transceiver, positioned in a reverse direction on the land-based vehicle relative to the prescribed path, and a third fixed narrowbeam transceiver mounted along the prescribed path;
 the forward wireless broadband channel and the reverse wireless broadband channel enabling the land-based vehicle to maintain 1.5 Gb/s or more continuous broadband access to a wide area network via a prescribed sequence of the fixed narrowbeam transceivers along the prescribed path while traveling at 320 kilometers per hour or more;
 maintaining the reverse broadband channel based on the second mobile narrowbeam transceiver switching from the third wireless optical broadband data link to a fourth wireless optical broadband data link with a fourth fixed narrowbeam transceiver mounted in reversed direction along the prescribed path; and
 the first fixed narrowbeam transceiver and the third fixed narrowbeam transceiver establishing a fifth wireless optical broadband data link in response to a determined absence of the land-based vehicle, enabling the fifth wireless optical broadband data link to bypass a wired cable between the first fixed narrowbeam transceiver and the third fixed narrowbeam transceiver, or to provide testing of at least one of the first fixed narrowbeam transceiver or the third fixed narrowbeam transceiver.

2. The method of claim 1, further comprising maintaining the continuous broadband access based on concurrently communicating along the forward and reverse broadband channels while connected to the respective fixed narrowbeam transceivers, and communicating along one of the broadband channels while the other of the broadband channels is switching to another fixed narrowbeam transceiver mounted along the prescribed path at the slew rate of one degree per millisecond or faster.

3. The method of claim 1, wherein the continuous broadband access is maintained at the 1.5 Gb/S or more data rate based on maintaining communication along the first and second wireless optical broadband data links for a minimum connected time interval, and buffering data traffic during a switching time for the switching from the first wireless optical broadband data link to the second wireless optical broadband data link, the switching time substantially less than each corresponding connected time interval.

4. The method of claim 1, wherein the switching comprises:
 the first mobile narrowbeam transceiver maintaining connection with the first fixed narrowbeam transceiver until detecting the land-based vehicle has reached a first prescribed path position along the prescribed path; and
 the first mobile narrowbeam transceiver slewing to a prescribed acquisition position for the second fixed narrowbeam transceiver in response to detecting the land-based vehicle reaching the first prescribed path position.

5. The method of claim 1, wherein the switching is based on the first mobile narrowbeam transceiver slewing from the first fixed narrowbeam transceiver to the second fixed narrowbeam transceiver at a slew angle of about ten (10) degrees or less, at a slew time of about ten (10) milliseconds or less.

6. An apparatus comprising:
 a first mobile narrowbeam transceiver positioned on a land-based vehicle and configured for establishing a first wireless optical broadband data link with a first fixed narrowbeam transceiver mounted along a prescribed path of the land-based vehicle, the first mobile narrowbeam transceiver positioned in a forward direction relative to the prescribed path to establish a forward wireless broadband channel at one Gigabit per second (1 Gb/s) or more;
 a second mobile narrowbeam transceiver positioned on the land-based vehicle in a reverse direction relative to the prescribed path and configured for establishing a reverse wireless broadband channel at one Gigabit per second (1 Gb/s) or more; and
 a processor circuit configured for causing the first mobile narrowbeam transceiver to maintain the forward wireless broadband channel based on the first mobile narrowbeam transceiver switching from the first wireless optical broadband data link to a second wireless optical broadband data link with a second fixed narrowbeam transceiver mounted along the prescribed path after the first fixed narrowbeam transceiver based on slewing of at least one of the first mobile narrowbeam transceiver on the land-based vehicle, the first fixed narrowbeam transceiver, or the second fixed narrowbeam transceiver, at a slew rate of one degree per millisecond or faster;
 the second mobile narrowbeam transceiver establishing the reverse wireless broadband channel at 1 Gb/s or more based on establishing a third wireless optical broadband data link with a third fixed narrowbeam transceiver mounted along the prescribed path;
 the forward wireless broadband channel by the first mobile narrowbeam transceiver and the reverse wireless broadband channel by the second mobile narrowbeam transceiver enabling the land-based vehicle to maintain 1.5 Gb/s or more continuous broadband access to a wide area network via a prescribed sequence of the fixed narrowbeam transceivers along the prescribed path while traveling at 320 kilometers per hour or more;

wherein the processor circuit is configured for maintaining the reverse broadband channel based on causing the second mobile narrowbeam transceiver to switch from the third wireless optical broadband data link to a fourth wireless optical broadband data link with a fourth fixed narrowbeam transceiver mounted in reversed direction along the prescribed path;

wherein the first fixed narrowbeam transceiver and the third fixed narrowbeam transceiver are configured for establishing a fifth wireless optical broadband data link in response to a determined absence of the land-based vehicle, enabling the fifth wireless optical broadband data link to bypass a wired cable between the first fixed narrowbeam transceiver and the third fixed narrowbeam transceiver, or to provide testing of at least one of the first fixed narrowbeam transceiver or the third fixed narrowbeam transceiver.

7. The apparatus of claim 6, wherein the processor circuit is configured for maintaining the continuous broadband access based on concurrently causing communications along the forward and reverse broadband channels while connected to the respective fixed narrowbeam transceivers, and causing the communications along one of the broadband channels while the other of the broadband channels is switching to another fixed narrowbeam transceiver mounted along the prescribed path at the slew rate of one degree per millisecond or faster.

8. The apparatus of claim 6, further comprising a memory circuit for buffering data traffic, the processor circuit configured for maintaining the continuous broadband access at the 1.5 Gb/s or more data rate based on maintaining communication along the first and second wireless optical broadband data links for a minimum connected time interval, and buffering data traffic in the memory circuit during a switching time for the switching from the first wireless optical broadband data link to the second wireless optical broadband data link, the switching time substantially less than each corresponding connected time interval.

9. The apparatus of claim 6, wherein the processor circuit is configured for switching the first mobile narrowbeam transceiver from the first wireless optical broadband data link to the second wireless optical broadband data link based on:
maintaining the connection with the first fixed narrowbeam transceiver by the first mobile narrowbeam transceiver until detecting the land-based vehicle has reached a first prescribed path position along the prescribed path; and
slewing the first mobile narrowbeam transceiver to a prescribed acquisition position for the second fixed narrowbeam transceiver in response to detecting the land-based vehicle reaching the first prescribed path position.

10. The apparatus of claim 6, wherein the first mobile narrowbeam transceiver is configured for switching based on slewing from the first fixed narrowbeam transceiver to the second fixed narrowbeam transceiver at a slew angle of about ten (10) degrees or less, at a slew time of about ten (10) milliseconds or less.

11. Logic encoded in one or more non-transitory tangible media for execution and when executed by a machine operable for:
establishing a first wireless optical broadband data link between a first mobile narrowbeam transceiver positioned on a land-based vehicle and a first fixed narrowbeam transceiver mounted along a prescribed path of the land-based vehicle, the first mobile narrowbeam transceiver positioned in a forward direction relative to the prescribed path to establish a forward wireless broadband channel at one Gigabit per second (1 Gb/s) or more;
maintaining the forward wireless broadband channel based on switching from the first wireless optical broadband data link, by the first mobile narrowbeam transceiver, to a second wireless optical broadband data link with a second fixed narrowbeam transceiver mounted along the prescribed path after the first fixed narrowbeam transceiver based on slewing of at least one of the first mobile narrowbeam transceiver on the land-based vehicle, the first fixed narrowbeam transceiver, or the second fixed narrowbeam transceiver, at a slew rate of one degree per millisecond or faster;
establishing a reverse wireless broadband channel at one Gigabit per second (1 Gb/s) or more based on establishing a third wireless optical broadband data link between a second mobile narrowbeam transceiver, positioned in a reverse direction on the land-based vehicle relative to the prescribed path, and a third fixed narrowbeam transceiver mounted along the prescribed path;
the forward wireless broadband channel and the reverse wireless broadband channel enabling the land-based vehicle to maintain 1.5 Gb/s or more continuous broadband access to a wide area network via a prescribed sequence of the fixed narrowbeam transceivers along the prescribed path while traveling at 320 kilometers per hour or more;
further operable for maintaining the reverse broadband channel based on the second mobile narrowbeam transceiver switching from the third wireless optical broadband data link to a fourth wireless optical broadband data link with a fourth fixed narrowbeam transceiver mounted in reversed direction along the prescribed path;
further operable for the first fixed narrowbeam transceiver and the third fixed narrowbeam transceiver establishing a fifth wireless optical broadband data link in response to a determined absence of the land-based vehicle, enabling the fifth wireless optical broadband data link to bypass a wired cable between the first fixed narrowbeam transceiver and the third fixed narrowbeam transceiver, or to provide testing of at least one of the first fixed narrowbeam transceiver or the third fixed narrowbeam transceiver.

12. The logic encoded in one or more non-transitory tangible media of claim 11, further operable for maintaining the continuous broadband access based on concurrently communicating along the forward and reverse broadband channels while connected to the respective fixed narrowbeam transceivers, and communicating along one of the broadband channels while the other of the broadband channels is switching to another fixed narrowbeam transceiver mounted along the prescribed path at the slew rate of one degree per millisecond or faster.

13. The logic encoded in one or more non-transitory tangible media of claim 11, wherein the continuous broadband access is maintained at the 1.5 Gb/S or more data rate based on maintaining communication along the first and second wireless optical broadband data links for a minimum connected time interval, and buffering data traffic during a switching time for the switching from the first wireless optical broadband data link to the second wireless optical broadband data link, the switching time substantially less than each corresponding connected time interval.

14. The logic encoded in one or more non-transitory tangible media of claim 11, wherein the switching comprises:
   the first mobile narrowbeam transceiver maintaining connection with the first fixed narrowbeam transceiver until detecting the land-based vehicle has reached a first prescribed path position along the prescribed path; and
   the first mobile narrowbeam transceiver slewing to a prescribed acquisition position for the second fixed narrowbeam transceiver in response to detecting the land-based vehicle reaching the first prescribed path position.

15. The logic encoded in one or more non-transitory tangible media of claim 11, wherein the switching is based on the first mobile narrowbeam transceiver slewing from the first fixed narrowbeam transceiver to the second fixed narrowbeam transceiver at a slew angle of about ten (10) degrees or less, at a slew time of about ten (10) milliseconds or less.

* * * * *